April 16, 1935.　　C. A. SAWTELLE ET AL　　1,998,096
BRAKE ASSEMBLY
Filed Aug. 25, 1930　　2 Sheets-Sheet 1
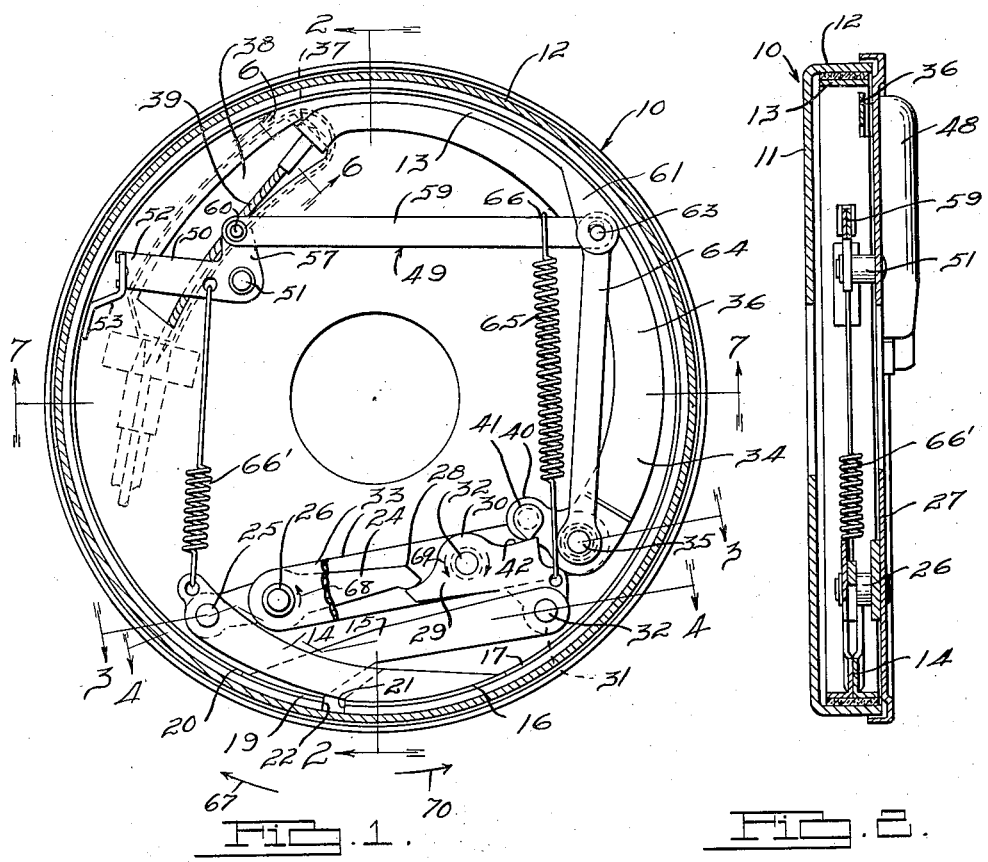
Fig. 1.　　Fig. 2.
Fig. 3.
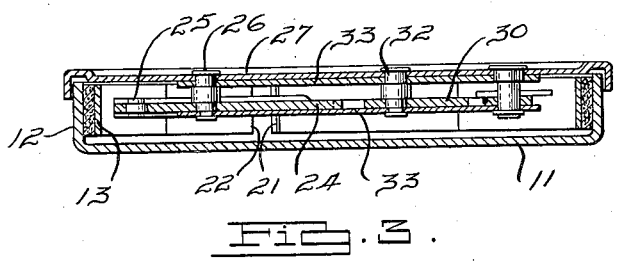
INVENTORS
Charles A. Sawtelle,
Armin A. Darmstaetter.
BY Whittemore Hulbert
Whittemore & Belknap
ATTORNEYS.

April 16, 1935.  C. A. SAWTELLE ET AL  1,998,096
BRAKE ASSEMBLY
Filed Aug. 25, 1930   2 Sheets-Sheet 2
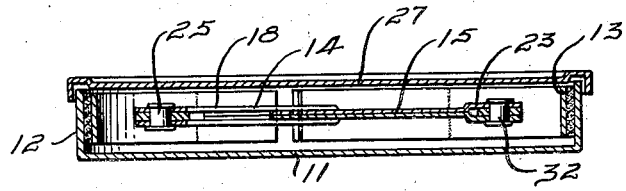
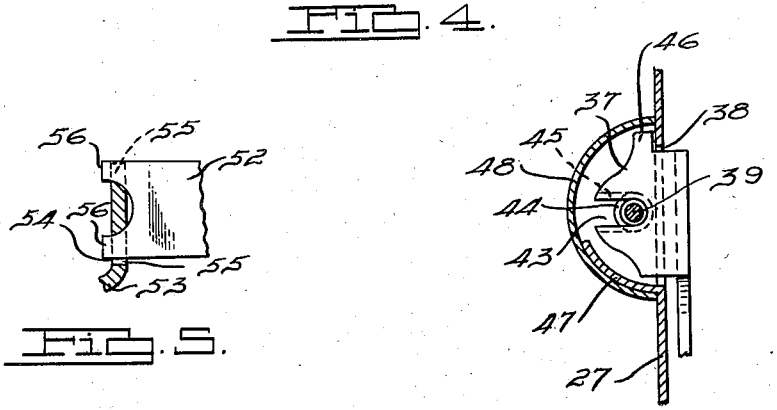
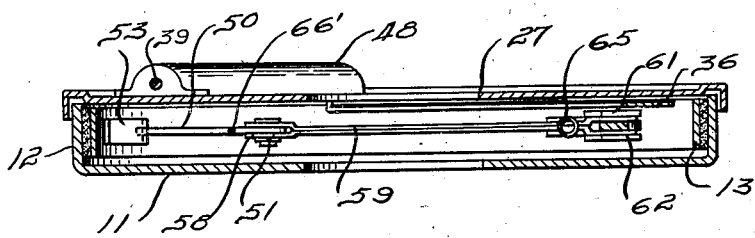
INVENTORS.
Charles A. Sawtelle.
Armin A. Darmstaetter
BY Whittemore Hulbert
Whittemore & Belknap
ATTORNEYS Patented Apr. 16, 1935

1,998,096

UNITED STATES PATENT OFFICE 1,998,096

BRAKE ASSEMBLY

Charles A. Sawtelle and Armin A. Darmstaetter, Detroit, Mich., assignors to S. and D. Engineering Company, Detroit, Mich., a corporation of Michigan Application August 25, 1930, Serial No. 477,714

13 Claims. (Cl. 188—78)

This invention relates to brake assemblies of the type having a brake band mounted within a brake drum for frictional engagement with the interior surface of the brake flange and has as one of its principal objects to provide actuating means for expanding the band into engagement with the brake flange so arranged with respect to the free ends of the band as to permit extending the said ends in close proximity to each other and thereby render it possible to utilize substantially the entire area of the flange as a braking surface. By utilizing practically the entire area of the flange, maximum braking force is obtained with a brake drum of minimum diameter.

In addition to the foregoing, the present invention contemplates a brake assembly so designed as to prevent grabbing and squeaking of the brakes when applied.

Another advantageous feature of the present invention resides in the provision of a brake assembly having means associated therewith for insuring concentricity of the brake band and drum and also to insure substantial uniform expansion and contraction of the brake band throughout its length.

A further object of this invention resides in the provision of a brake assembly so constructed that the wrapping force of one portion of the brake assists in operating the unwrapping force in the other portion of the brake so as to more nearly equalize the braking efficiency of these two portions. The design of the brake assembly is such, however, that there will always be a predominance of the wrapping force so that the brake will be, to a certain extent, self-energizing.

A still further object of the present invention is to provide brake mechanism of the type specified above which lends itself to economical manufacture owing to the relatively few number of parts involved and to the simplicity of these parts. Accordingly, other advantageous features of the present invention reside in the novel details of construction which will be made more apparent as this description proceeds, especially when considered in connection with the accompanying drawings, wherein:

Figure 1 is a side elevational view of a brake assembly with certain parts removed for the sake of clearness;

Figure 2 is a sectional view taken substantially on the plane indicated by the line 2—2 of Figure 1;

Figure 3 is a sectional view taken substantially on the plane indicated by the line 3—3 of Figure 1;

Figure 4 is a fragmentary plane view of the brake band actuating arms;

Figure 5 is a detail sectional view illustrating the manner in which one of the links is connected to the brake band;

Figure 6 is a sectional view taken substantially on the plane indicated by the line 6—6 of Figure 1; and Figure 7 is a sectional view taken substantially on the plane indicated by the line 7—7 of Figure 1.

Generally described, the brake assembly illustrated herein comprises a brake drum 10 of conventional design having a radially extending web portion 11 terminating at the periphery thereof in an axially extending annular brake flange 12. Positioned within the brake drum 10 concentric with the brake flange 12 is a suitable brake band 13 extending around the greater portion of the interior circumference of the flange and having the free ends operatively connected together by suitable linkage, to be presently described, for expanding and contracting the band within the drum.

The linkage for operatively connecting the free ends of the band comprises a pair of arms 14 and 15 extending in directions transverse to each other and arranged in overlapping relation as shown in Figure 1. The arm 14 terminates at one end in oppositely extending lateral flanges 16 conforming in curvature to the brake band 13 and adapted to be butt-welded or otherwise suitably secured to the free end 17 of the band to form a continuation thereof. The opposite end portion of the arm 14 projects circumferentially of the brake band beyond the free end of the arcuate flange 16 and is bifurcated as at 18 for receiving the arm 15. The latter arm also terminates at the outer end thereof in a flanged portion 19 conforming in curvature to the brake band 13 and adapted to be butt-welded or otherwise suitably secured to the free end 20 of the brake band to form a continuation thereof. The opposite end portions of the arm 15 extend inwardly between the furcations of the bifurcated portion 17 of the arm 14 and extend a substantial distance beyond the free end of the flanged portion 19 thereof. Thus, from the foregoing it will be apparent that the flanged portions of the arms function as part of the brake band and since the arms are crossed, as shown in Figure 1, the free ends 21 and 22 of the extensions 16 and 19, respectively, may be extended in relatively close proximity to each other with the result that substantially the entire area of the brake flange 12 is utilized as a braking surface. The advantage of the above arrangement is believed obvious since it permits obtaining maximum braking force with a brake drum of minimum diameter. It will further be seen that the arms 14 and 15 are so positioned relative to the brake band that a force exerted upon the free ends of the arms moves the brake band with a combined radial and circumferential movement which results in the uniform engagement of the band with the brake drum throughout the length of the former.

The inner end of the arm 14 is bifurcated as at 23 for receiving the outer end of a suitable lever 24 which is pivotally connected to the furcations by means of the pin 25. The lever 24 is pivoted as at 26 intermediate the ends thereof to the back plate 27 which cooperates with the web 11 and brake flange 12 to conceal the brake mechanism. The inner end 28 of the lever 24 is adapted to rest upon the arm 29 of a suitable bell crank lever 30 having an opposed arm 31 pivotally connected as at 32 to the free end of the arm 15. Thus, it will be seen that the arms 14 and 15 are connected together by means of the levers 24 and 30. The bell crank lever 30 is pivotally mounted intermediate the arms upon a pin 32 between the laterally spaced plates 33 carrying the pin 32 and having the rear ends thereof secured to the pin 26. The above arrangement is such that rotation of the bell crank lever 30 in the direction of the arrow in Figure 1 causes the arm 31 of the lever to actuate the end 22 of the brake band, and the arm 29 to rock the lever 24 about the pin 26 in the direction of the arrow to effect an actuation of the end 21 of the brake band.

For rotating the bell crank lever 30 to effect the foregoing results, we provide a bell crank lever 34 pivotally connected by means of the pin 35 to the back plate 27 and having a relatively long arcuate arm 36 extending in close proximity to the interior surface of the brake band 13 and terminating in a lateral projection 37 adapted to extend through an arcuate slot 38 in the web 11 of the drum for engagement with a suitable actuating cable 39. The shorter arm 40 of the bell crank lever 34 is provided with a cam portion 41 adapted to engage a cam surface 42 on the bell crank lever 30. The point of engagement of the cam 41 with the bell crank lever 42 is so determined that when the arm 36 is rocked inwardly by the cable 39, the bell crank lever will be rotated in the direction of the arrow to actuate the brake band.

As previously described, the bell crank lever 34 or the arm 36 thereof is actuated by the cable 39 which, as shown in Figure 6, is engaged within a slot 43 in the projection 37 and is provided with an enlarged head portion 44 engageable within a countersunk portion 45 of the slot and normally maintained in said engagement by the tension on the cable 39. The projection 37 is provided with a lug portion 46 exteriorly of the web 11 for preventing accidental movement of the projection 37 inwardly through the slot 38. The cable 39 is guided to impart a direct pull on the arm 36 by means of a flange 47 extending outwardly from the inner wall of the slot 38. The slot 38 is protected against the entrance of water or other foreign elements and designed to prevent accidental displacement of the cable from engagement with the slot by means of an arcuate housing 48 secured to the web 11 in any suitable manner. The above construction is such that the arm 36 of the bell crank lever 34 has sufficient travel to take up all wear of the brake band.

In order to insure the desired uniform expansion and contraction of the brake band throughout its length and to also insure concentricity of the brake band within the drum, we provide suitable linkage 49 having the opposite ends thereof engaging the brake band at points spaced predetermined distances from the actuated ends thereof and from each other. The linkage 49 comprises a bell crank lever 50 pivotally connected by means of a pin 51 to the back plate 27 and having a relatively long arm 52 pivotally connected to one side portion of the brake band by means of a bracket 53. As shown particularly in Figure 5, the bracket 53 is provided with a portion 54 having vertically spaced openings 55 therein for receiving suitable spaced projections 56 extending from the outer end of the arm 52. As shown, the portion of the end of the arm 52 intermediate the projections 56 is substantially semi-circular for engaging the inner arcuate walls of the slots 55. Thus, it will be seen that the connection between the bell crank lever and bracket 53 is accomplished without the use of pins or similar devices. The small arm 57 of the bell crank lever 50 is adapted to extend within a bifurcated portion 58 of a link 59 and is pivotally connected to the furcations of the said portion by means of a pin 60. The opposite end of the link 59 is also bifurcated and is adapted to be connected to the brake band by means of a bracket 61 extending inwardly from the latter. The inner portion of the bracket 61 is bifurcated as at 62 for receiving the bifurcated portion of the link 59 and is pivotally connected thereto by means of a pin 63 extending through the furcations of the said bifurcated portions. Journaled upon the pin intermediate the furcations of the link 59 is an anchoring link 64 having the lower end journaled upon the pin 35 as clearly shown in Figure 1 of the drawings. In this connection it is to be noted that the opening in the bracket 61 through which the pin 63 projects is slightly larger than the pin so as to permit a slight rotative movement of the brake band and actuating means therefor, the purpose of which will be more fully hereinafter set forth.

The brake band and associated parts thereof are normally maintained in inoperative position by means of a suitable spring 65 having one end connected as at 66 to the link 59 adjacent the pivotal connection thereof to the anchoring link 64 and having the opposite end connected to the bell crank 30 at a point adjacent the connection of the arm 31 of the latter bell crank to the arm 15. The spring 65 is assisted in its function, as pointed out above, by means of a second spring 66' having the upper end connected to the bell crank lever 50 at a point spaced outwardly from the pivot 51 thereof and having the lower end connected to the free end of the arm 14. Thus, it will be seen that the spring 66', in addition to assisting the spring 65 in returning the parts to inoperative position, also serves to yieldably maintain the inner end 28 of the lever 24 in operative engagement with the arm 29 of the bell crank lever 30.

*Operation*

When the parts are properly adjusted, the brake band 13 will be normally held with its braking surface slightly out of contact with the brake flange 12 and owing to the linkage 49, specified above, will be concentric thereto. Assuming that the parts are in the above position and it is desired to set the brakes, the cable 39 is actuated by suitable pedal connections (not shown) so as to cause the arm 36 of the bell crank 34 to move inwardly about the pin 35. Movement of the arm 36 inwardly causes a corresponding movement of the arm 40 and owing to its engagement with the bell crank lever 30, as specified above, the latter will be rotated in the direction of the arrow to expand the brake band 13 in frictional contact with the inner surface of the brake flange 12 in a manner also described with some particularity above. Movement of the band into frictional engagement with the drum when the latter is rotating in the direction of the arrow 67 tends to rotate the band in a corresponding direction. Limited rotation of the band in this direction is permitted owing to the slotted engagement of the pin 63 with the bracket 61 and owing to the fact that the pin 25, constituting an anchor for the band when rotating in the aforesaid direction, is free to move relative to the drum or in other words, functions as a floating anchor. Rotation of the band relative to the drum develops what is commonly known to the trade as a wrapping force tending to move the band into firmer engagement with the drum and the pressure built up by this force is transmitted through the arm 14 to the anchor 25 and since this anchor is floating, there will be a tendency to move the same inwardly of the drum and in so doing tend to rock the lever 24 in a direction opposite to that indicated by the arrow 68 in Figure 1. It follows, therefore, that since the inner end of the lever 24 engages the arm 29 of the bell crank 30, the pressure developed by the wrapping force builds up upon the arm 29 tending to rotate the bell crank in the direction of the arrow 69 to oppose the pressure exerted upon the bell crank by the foot pedal (not shown). It will be observed, however, that the pressure exerted by the wrapping force tending to rotate the bell crank 30 in a direction to oppose the pedal pressure, also functions to rotate the arm 31 of the lever 30 in the direction of the arrow 69 and since the arm 31 is connected to the end 22 of the band, as shown in Figure 1, movement of the latter end in the direction of rotation of the drum will be resisted by a force depending upon the proportion of the levers 24 and 30. Thus, it will be seen that the wrapping force is accurately controlled and prevented from locking the brake.

When the brake drum is rotating in a reverse direction as indicated by the arrow 70, the band is prevented from rotation by the pin 35 which is permanently secured to the backing plate and which is connected to the band by the anchoring link 64 and bracket 61. In other words, during reverse rotation of the drum, a permanent anchor is provided for the band and the construction is such that only that portion of the band between the end 21 and the point of connection between the link 64 and band develops a wrapping force. However, since the anchor 35 is connected to the band as at 63, the pressure developed by the wrapping force is applied directly to the pin and thereby prevented from increasing the pedal pressure. The amount of wrapping force developed in reverse braking depends upon the location of the connection between the link and band which is so selected to give ideal operation. In this connection it is to be noted that in the event that the end 21 of the band moves slightly in the direction of the arrow 70, it would not affect the pedal pressure since the lever 24 would merely travel away from the bell crank. Thus, from the foregoing it will be observed that the pressure exerted by the wrapping force in reverse braking is permanently anchored and does not affect pedal pressures with the result that in reverse braking only sufficient pedal pressure need be applied to move the portions of the band between the connection 63 and end 22 thereof into engagement with the drum.

What we claim as our invention is:

1. In a brake assembly, the combination with a brake drum having an annular brake flange, of a brake band mounted within the drum concentric with the flange for engagement therewith and having circumferentially spaced end portions, means for actuating the ends of the band to expand the same against the flange including arms extending in opposite directions from the ends of the band in overlapping relation and having arcuate portions secured to the free ends of the band forming extensions of the braking surface thereof.

2. In a brake assembly, the combination with a brake drum having an annular brake flange, of a brake band mounted within the drum concentric with the flange for engagement with the inner surface thereof and having circumferentially spaced end portions, means for actuating the ends of the band to expand the same against the flange including, an arm secured to one end of the band and extending circumferentially beyond the said end, a second arm secured to the opposite end of the band and having a portion extending circumferentially beyond the said end in overlapping relation with the other arm.

3. In a brake assembly, the combination with a brake drum having an annular brake flange, of a brake band mounted within the drum concentric with the flange for engagement with the inner surface of the latter and having circumferentially spaced end portions, means for actuating the end portions to expand the band against the flange including, an arm having an arcuate portion secured to one end of the band forming an extension of the braking surface thereof and having a body portion extending circumferentially beyond the opposite end portion of the band, a second arm having an arcuate portion secured to the opposite end of the band to form a further extension of the braking surface area of the band and having another portion crossing the arm aforesaid and extending circumferentially beyond the arcuate portion thereof, and means operatively connecting the free ends of said arms for actuating the same.

4. In a brake assembly, the combination with a brake drum having an annular brake flange, of a brake band mounted within the drum concentric with the flange for engagement with the inner surface thereof and having opposite end portions arranged in relatively close proximity to each other, means for actuating the ends aforesaid to expand the band against the flange including, an arm secured to one end of said band and extending circumferentially beyond the same and a second arm secured to the opposite end of the band and extending beyond the latter in overlapping relation with the other arm, and means operatively connecting the free ends of said arms for actuating the same.

5. In a brake assembly, the combination with a rotating drum having an annular brake flange, of a brake band mounted within the drum concentric with the flange and having circumferentially spaced end portions, a rockable lever having one end operatively connected to one of the end portions of the band, a second rockable lever having one end operatively connected to the other end portion of the band and having the opposite end bearing upon the free end of said first-mentioned lever providing for movement of said second lever away from the first lever upon rotation of the band in one direction, and means for rocking said first-named lever in a direction to cause a corresponding rocking movement of the second lever through the bearing engagement therebetween and thereby move the end portions of the band away from each other into engagement with the drum.

6. In a brake assembly, the combination with a brake drum and a brake band associated therewith, of means permitting limited rotation of the band in the direction of rotation of the drum when the latter is rotating in one direction to build up a wrapping force, linkage movable with the band and operable to control the pressure developed by the wrapping force, and means for preventing rotation of the band when the drum is rotating in the opposite direction.

7. In a brake assembly, the combination with a brake drum and a brake band associated therewith, of a floating anchor for the band permitting limited rotation thereof in the direction of the drum when the latter is rotating in one direction to give a preponderance of wrapping force, means for actuating the band including floating linkage establishing a connection between the free ends of the band and proportioned to control the wrapping force, and a permanent anchor for the band functioning when the drum is rotating in the reverse direction.

8. In a brake assembly, the combination with a brake drum and a brake band associated therewith, of a floating anchor for the band permitting limited rotation thereof in the direction of the drum when the latter is rotating in one direction to give a preponderance of wrapping force, means for accurately controlling the wrapping force including linkage establishing an operative connection between the ends of the band and movable as a unit therewith, and a permanent anchor for the band when the drum is rotating in the opposite direction positioned to give a predetermined wrapping force in this direction also.

9. In a brake assembly, the combination with a brake drum and a brake band associated therewith having actuating mechanism operatively connecting the free ends thereof and forming a unit with the same, of a permanent anchor for the band functioning when the drum is rotating in one direction to prevent rotation thereof, and a floating anchor for the band when the drum is rotating in the opposite direction.

10. In a brake assembly, the combination with a brake drum and a brake band associated therewith, of a permanent anchor for the band when the drum is rotating in one direction selected to give a predetermined wrapping force, a floating anchor for the band functioning when the drum is rotating in the opposite direction to give a preponderance of wrapping force, and means for controlling the amount of wrapping force developed by the band during rotation of the drum in the latter direction.

11. In a brake assembly, the combination with a brake drum having an annular brake flange, of a transversely split brake band located within the drum for engagement with the brake flange and having laterally spaced end portions, of means permitting limited rotation of the band in the direction of rotation of the drum when the latter is rotating in one direction to build up a wrapping force, and means for controlling the pressure developed by the wrapping force including linkage establishing a connection between the ends aforesaid of the band and capable of restricted movement as a unit with the band.

12. In a brake assembly, the combination with a brake drum having an annular brake flange, of a transversely split brake band located within the drum having spaced end portions, of a floating anchor for the band permitting limited rotation of the same in the direction of rotation of the drum when the latter is rotating in one direction to build up a wrapping force, and means for expanding the band into engagement with the brake flange and for also controlling the pressure developed by the wrapping force, said means including linkage connecting the free ends of the band and capable of restricted movement as a unit with the band.

13. In a brake assembly, the combination with a brake drum having an annular brake flange, of a brake band mounted within the drum concentric with the flange for engagement with the inner surface thereof and having spaced end portions, an arm secured to one of the aforesaid end portions of the band and extending beyond the said end, a second arm secured to the opposite end of the band and having a portion extending beyond the latter and in overlapping relation with the first named arm, and means interconnecting the free ends of the arms for actuating the band including pivotally mounted levers engageable with each other at adjacent ends in such a manner as to provide for actuation of one of the levers by the other and to permit the latter lever to move freely relative to the first named lever.

ARMIN A. DARMSTAETTER.
CHAS. A. SAWTELLE.